US012601316B2

(12) United States Patent
Pichler et al.

(10) Patent No.: US 12,601,316 B2
(45) Date of Patent: Apr. 14, 2026

(54) METHOD AND DEVICE FOR DIAGNOSING A LEAK IN AN EVAPORATION SYSTEM AND IN A TANK VENTILATION LINE OF AN INTERNAL COMBUSTION ENGINE

(71) Applicant: Vitesco Technologies GmbH, Regensburg (DE)

(72) Inventors: Thomas Pichler, Hohenau (DE); Tobias Hirthammer, Langquaid (DE); Thomas Koenig, Wörth an der Donau (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/156,754

(22) Filed: Jan. 19, 2023

(65) Prior Publication Data

US 2023/0151780 A1 May 18, 2023

Related U.S. Application Data

(63) Continuation of application No. PCT/EP2021/070352, filed on Jul. 21, 2021.

(30) Foreign Application Priority Data

Jul. 21, 2020 (WO) ................. PCT/EP2020/070593
Nov. 5, 2020 (DE) ..................... 10 2020 213 935.0

(51) Int. Cl.
*F02M 25/00* (2006.01)
*F02M 25/08* (2006.01)

(52) U.S. Cl.
CPC .... *F02M 25/0818* (2013.01); *F02M 25/0836* (2013.01)

(58) Field of Classification Search
CPC ........... F02M 25/0818; F02M 25/0836; F02M 25/0854; F02M 25/089; F02M 25/0809; F02D 41/003
See application file for complete search history.

(56) References Cited

U.S. PATENT DOCUMENTS 5,460,143 A 10/1995 Narita
6,216,674 B1 * 4/2001 Corkill ............... F02M 25/0809 123/520

(Continued)

FOREIGN PATENT DOCUMENTS

CN 105089866 A 5/2015
DE 60131484 T2 7/2008

(Continued)

OTHER PUBLICATIONS

International Search Report and Written Opinion dated Aug. 26, 2021 from corresponding International Patent Application No. PCT/EP2021/070352.

(Continued)

*Primary Examiner* — Logan M Kraft
*Assistant Examiner* — Sherman D Manley

(57) ABSTRACT

A method and device for diagnosing a leak in an evaporation system and in a tank ventilation line of an internal combustion engine is disclosed. The method includes diagnosing the entire evaporation system using a fresh-air shut-off valve of the evaporation system and a pressure sensor system of the evaporation system. During the check on whether there is a leak in the evaporation system of the internal combustion engine, a separate check of different diagnosis regions of the evaporation system is undertaken, where one of these diagnosis regions is a tank region of the internal combustion engine and a further diagnosis region is a filter region of the internal combustion engine. During the diagnosis of the tank (Continued)

ventilation line, the flow through the tank ventilation line is checked.

7 Claims, 6 Drawing Sheets

(56) References Cited

U.S. PATENT DOCUMENTS

| | | | | |
|---|---|---|---|---|
| 10,173,520 | B1 * | 1/2019 | Guo | B60K 15/03504 |
| 11,333,095 | B1 * | 5/2022 | Dudar | F02M 25/0836 |
| 11,473,533 | B1 * | 10/2022 | Dudar | F02M 25/0836 |
| 11,525,422 | B1 * | 12/2022 | Dudar | F02M 25/0809 |
| 11,585,298 | B1 * | 2/2023 | Dudar | F02M 25/0809 |
| 11,619,195 | B2 * | 4/2023 | Collet | F02M 25/0818 701/107 |
| 11,725,610 | B2 * | 8/2023 | Pichler | F02D 41/042 123/518 |
| 2011/0067487 | A1 * | 3/2011 | Haag | F02M 25/089 73/40 |
| 2012/0186333 | A1 * | 7/2012 | Nishimura | G01M 3/3263 73/40.5 R |
| 2013/0074583 | A1 * | 3/2013 | Perry | F02M 25/0809 73/40.7 |
| 2014/0107906 | A1 * | 4/2014 | Jentz | F02M 37/0088 180/65.21 |
| 2014/0109882 | A1 * | 4/2014 | Hoegl | F02B 37/00 123/559.1 |
| 2015/0075251 | A1 * | 3/2015 | Jentz | F02M 25/0809 73/1.63 |
| 2015/0328980 | A1 | 11/2015 | Meinken | |
| 2015/0345436 | A1 * | 12/2015 | Yang | F02M 25/0809 123/519 |
| 2015/0354478 | A1 * | 12/2015 | Dudar | F02D 41/003 123/519 |
| 2016/0076493 | A1 * | 3/2016 | Koller | F16K 31/0672 251/279 |
| 2016/0273493 | A1 * | 9/2016 | Ono | F02M 25/0809 |
| 2016/0341156 | A1 * | 11/2016 | Yang | F02M 25/0809 |
| 2016/0348614 | A1 * | 12/2016 | Dudar | B60T 13/46 |
| 2017/0030303 | A1 * | 2/2017 | Takakura | F02M 25/0809 |
| 2017/0058799 | A1 * | 3/2017 | Dudar | F02M 25/0836 |
| 2017/0145963 | A1 * | 5/2017 | Dudar | B60K 15/03504 |
| 2017/0314480 | A1 * | 11/2017 | Brinkaemper | F02M 25/0809 |
| 2018/0045143 | A1 * | 2/2018 | Dudar | F02M 37/0076 |
| 2018/0100470 | A1 * | 4/2018 | Ooiwa | F02M 25/0809 |
| 2019/0120716 | A1 * | 4/2019 | Murata | G01M 3/2876 |
| 2019/0242331 | A1 * | 8/2019 | Kato | F02M 25/0836 |
| 2019/0249621 | A1 * | 8/2019 | Kugo | F02M 25/0809 |
| 2019/0249623 | A1 * | 8/2019 | Kugo | F02D 41/004 |
| 2020/0141360 | A1 * | 5/2020 | Takagi | F02M 25/0809 |
| 2020/0309069 | A1 * | 10/2020 | Eser | F02M 25/089 |
| 2021/0040920 | A1 * | 2/2021 | Miyabe | F02M 25/0854 |
| 2021/0062739 | A1 * | 3/2021 | Shinagawa | F02M 25/0809 |
| 2021/0239057 | A1 * | 8/2021 | Uchida | F02M 35/10222 |
| 2021/0302266 | A1 * | 9/2021 | Kishi | G01M 3/3272 |
| 2021/0363942 | A1 * | 11/2021 | Ishihara | F02M 25/0809 |
| 2022/0205414 | A1 * | 6/2022 | Pichler | F02D 41/08 |
| 2022/0389887 | A1 * | 12/2022 | Hidai | F02M 25/089 |
| 2022/0389888 | A1 * | 12/2022 | Hidai | F02M 25/0809 |

FOREIGN PATENT DOCUMENTS

| | | | |
|---|---|---|---|
| DE | 102015209701 | A1 | 12/2016 |
| DE | 102018217630 | A1 | 4/2020 |
| DE | 102012008686 | B4 | 1/2021 |
| DE | 102009036263 | B4 | 6/2022 |
| WO | 2021013887 | A1 | 1/2021 |

OTHER PUBLICATIONS

German Office Action dated May 31, 2022 for corresponding German Patent Application No. 10 2020 213 935.0.

Chinese Office Action Dated Jul. 10, 2025 for corresponding Patent Application No. 202180049070.4.

* cited by examiner

METHOD AND DEVICE FOR DIAGNOSING A LEAK IN AN EVAPORATION SYSTEM AND IN A TANK VENTILATION LINE OF AN INTERNAL COMBUSTION ENGINE

CROSS-REFERENCE TO RELATED APPLICATIONS

This application claims the benefit of International Application PCT/EP2020/070593 filed Jul. 21, 2020 and German Application 10 2020 213 935.0, filed Nov. 5, 2020. The disclosures of the above applications are incorporated herein by reference.

TECHNICAL FIELD

The disclosure relates to a method and a device for diagnosing a leak in an evaporation system and in a tank ventilation line of an internal combustion engine.

BACKGROUND

In order to limit pollutant emissions, modern motor vehicles which are driven by an internal combustion engine are equipped with fuel evaporation retention systems, normally referred to as tank ventilation devices. The purpose of such devices is to accommodate and temporarily store fuel vapor which forms in a fuel tank as a result of evaporation, such that the fuel vapor cannot escape into the environment. As a store for the fuel vapor, a fuel vapor retention filter, which utilizes, for example, activated carbon as a storage medium, is provided in the fuel evaporation retention system. The fuel vapor retention filter only has a limited storage capacity for fuel vapor. To be able to utilize the fuel vapor retention filter over a long period of time, it must be regenerated. To this end, a controllable tank ventilation valve is arranged in a line between the fuel vapor retention filter and an intake pipe of the internal combustion engine, which valve is opened for performing the regeneration such that, on the one hand, the fuel vapors adsorbed in the fuel vapor retention filter escape into the intake pipe due to the negative pressure in the latter, and thus are fed into the intake air of the internal combustion engine and therefore to the combustion process and, on the other hand, the storage capacity of the fuel vapor retention filter for fuel vapor is restored.

A known tank system equipped with a leak diagnosis unit at the fresh-air inlet of the activated carbon filter is shown in FIG. 1. The tank system shown includes a fuel tank 1 and a tank shut-off valve 2. The tank shut-off valve 2, via which the hydrocarbon vapors generated in the fuel tank 1 can be retained in the tank in order to subsequently be fed in a controlled manner under suitable operating conditions to an activated carbon filter 9. The tank system also includes a tank ventilation valve 3 which can be configured as a switching or linear valve and which is actuated by an engine controller 4 in order to regulate the gas flow from the activated carbon filter 9 to an air path 5 of the internal combustion engine. The tank system also includes a tank ventilation line 6 (tank region) between the fuel tank 1 and the tank shut-off valve 2. The activated carbon filter 9, in which hydrocarbons outgassed from the fuel tank 1 are bound. The tank system also includes a tank ventilation line 7 (filter region), via which the hydrocarbon gases are conducted from the fuel tank 1 into the activated carbon filter 9 and onward to the tank ventilation valve 3. Additionally, the tank system includes a tank ventilation line 8 (engine region), via which the hydrocarbon gases are introduced downstream of the tank ventilation valve 3 from the activated carbon filter 9 into the air path 5 of the internal combustion engine. A pressure sensor 10, is also part of the tank system and is in the tank ventilation line 7 (filter region) between the activated carbon filter 9 and the tank ventilation valve 3. The tank system also includes a pressure sensor and a temperature sensor in the fuel tank 1 or a combined pressure/temperature sensor 11. An engine controller 4 of the tank system determines a setpoint value for the purge flow from the activated carbon filter 9 to the air path of the internal combustion engine for the current operating state. The engine controller 4 also determines an intake pipe pressure in the intake tract with the aid of a pressure sensor and reads in the values of the pressure or temperature sensor system. Additionally, the engine controller 4 determines, from the pressure gradient between the fresh-air filter 13 of the activated carbon filter 9 and the pressure at the introduction point into the air path 5 of the internal combustion engine from the predefined purge flow, a PWM value for the actuation of the tank ventilation valve 3. Additionally, the engine controller 4 calculates the fuel quantity to be injected for the current operating status of the engine.

According to various country-specific legal regulations or for safety reasons, it is necessary to guarantee or diagnose the functionality of the fuel tank ventilation system including the fuel tank.

Specifically, it is necessary to check the entire evaporation system including the fuel tank up to the tank ventilation valve (see tank region 23 and filter region 24 in FIG. 1) for leak-tightness. In this case, there are different legal requirements regarding the smallest leak diameter to be diagnosed.

Furthermore, the continuity of the tank ventilation lines downstream of the tank ventilation valve as well as the maintenance of the mass flow between the activated carbon filter and the introduction point of the tank ventilation gas into the air path of the internal combustion engine must be guaranteed. This includes checking the functionality of the tank ventilation valve.

The leak-tightness test of the evaporation system required by various legislators exclusively for the tank region and the filter region is carried out for the known system represented in FIG. 1 with or, possibly, also without a tank shut-off valve by deploying leak diagnosis pumps (leak diagnosis unit 12; see FIG. 1). This leak diagnosis unit 12 pressurizes the evaporation system or generates a vacuum after a defined time interval after the internal combustion engine has been shut down (vehicle standstill). Subsequently, depending on the embodiment, the resulting pressure course or the electrical power consumed by the leak diagnosis unit is then enlisted as an evaluation criterion for establishing a leak diameter. However, such a procedure is time-consuming, causes additional energy consumption for actuating the pumps and generates noise emissions when the vehicle is at a standstill.

A diagnosis of the purge lines 15 and 16 arranged in the engine region 25 (see FIG. 1) and of the tank ventilation valve 3 is executed by the imprinting of a specific actuation pattern (prompt to the tank ventilation valve to open) under defined engine operating conditions and when the tank ventilation function is deactivated. In this case, the pressure changes (pressure sensor in the tank ventilation line (filter region)) generated during the actuation of the tank ventilation valve are evaluated.

SUMMARY

One aspect of the disclosure provides a method for diagnosing a leak in an evaporation system and in a tank ventilation line of an internal combustion engine, in contrast to the method described with reference to FIG. 1, a fresh-air shut-off valve is used inter alia instead of the leak diagnosis unit provided on the fresh-air side of the activated carbon filter. The method includes diagnosing the evaporation system using the fresh-air shut-off valve of the evaporation system and a pressure sensor system of the evaporation system. During the check on whether there is a leak in the evaporation system of the internal combustion engine, a separate check of different diagnosis regions of the evaporation system is undertaken. One of these diagnosis regions is a tank region of the internal combustion engine and a further diagnosis region is a filter region of the internal combustion engine. During the diagnosis of the tank ventilation line, the flow through the tank ventilation line is checked.

In some implementations, during the check of the tank region, a pressure change resulting from a temperature change of the gas volume in the fuel tank is evaluated with a constant fuel tank volume after the internal combustion engine has been shut down and while the vehicle is at a standstill. In some examples, during the check of the tank region, an expected pressure profile from a predefined temperature profile during the temperature change after an ignition terminal of the internal combustion engine has been switched on is compared with a measured pressure profile from a previous vehicle standstill phase and then. If the measured pressure profile lies within a predefined tolerance range around the expected pressure profile, the presence of a leak-free tank region is recognized.

In some implementations, during the check of the filter region the fresh-air shut-off valve is closed, after a predefined waiting time, an evacuation of the filter region including the tank ventilation line arranged in the filter region is undertaken by opening a tank ventilation valve, the tank ventilation valve is closed after a predefined negative pressure has been reached, and an ensuing pressure gradient is calculated and evaluated after the tank ventilation valve has been closed.

During the check of the tank ventilation line, in some examples, a check of the tank ventilation valve arranged in the tank ventilation line is undertaken and a check of one or more purge paths arranged between the tank ventilation valve and the air path of the internal combustion engine is undertaken. In some examples, during the check of the tank ventilation valve a tank ventilation valve which is jammed closed or jammed open is recognized.

Another aspect of the disclosure provides a device for the combined diagnosis of a leak in an evaporation system and in a tank ventilation line of the internal combustion engine, where the evaporation system has a fresh-air shut-off valve arranged between an activated carbon filter and a fresh-air filter, a pressure sensor system and an engine controller configured to control a method according to the first aspect of the disclosure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
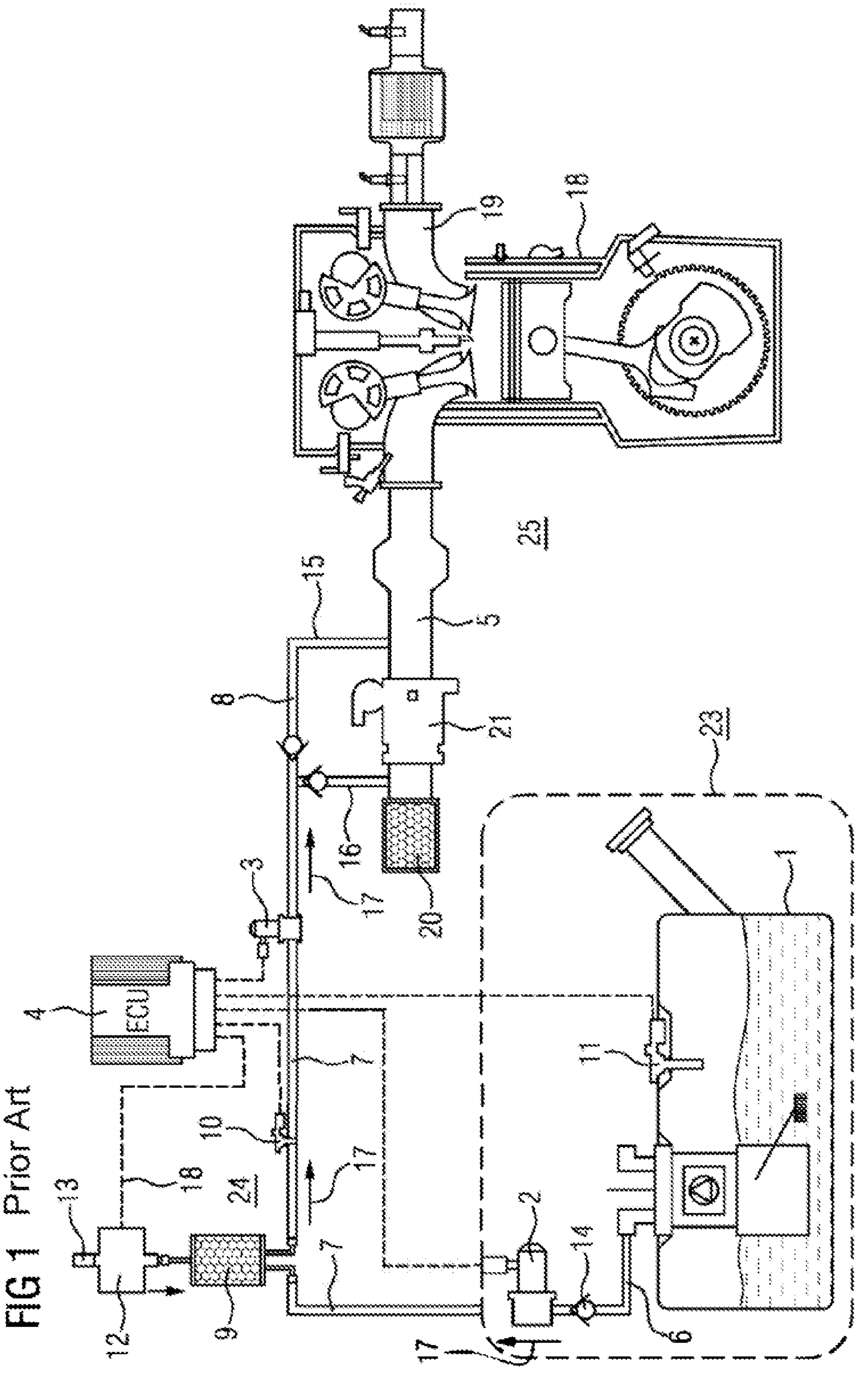
FIG 1 Prior Art
FIG. 1 shows a schematic representation of a known fuel evaporation retention system of an internal combustion engine.
Figure 2:
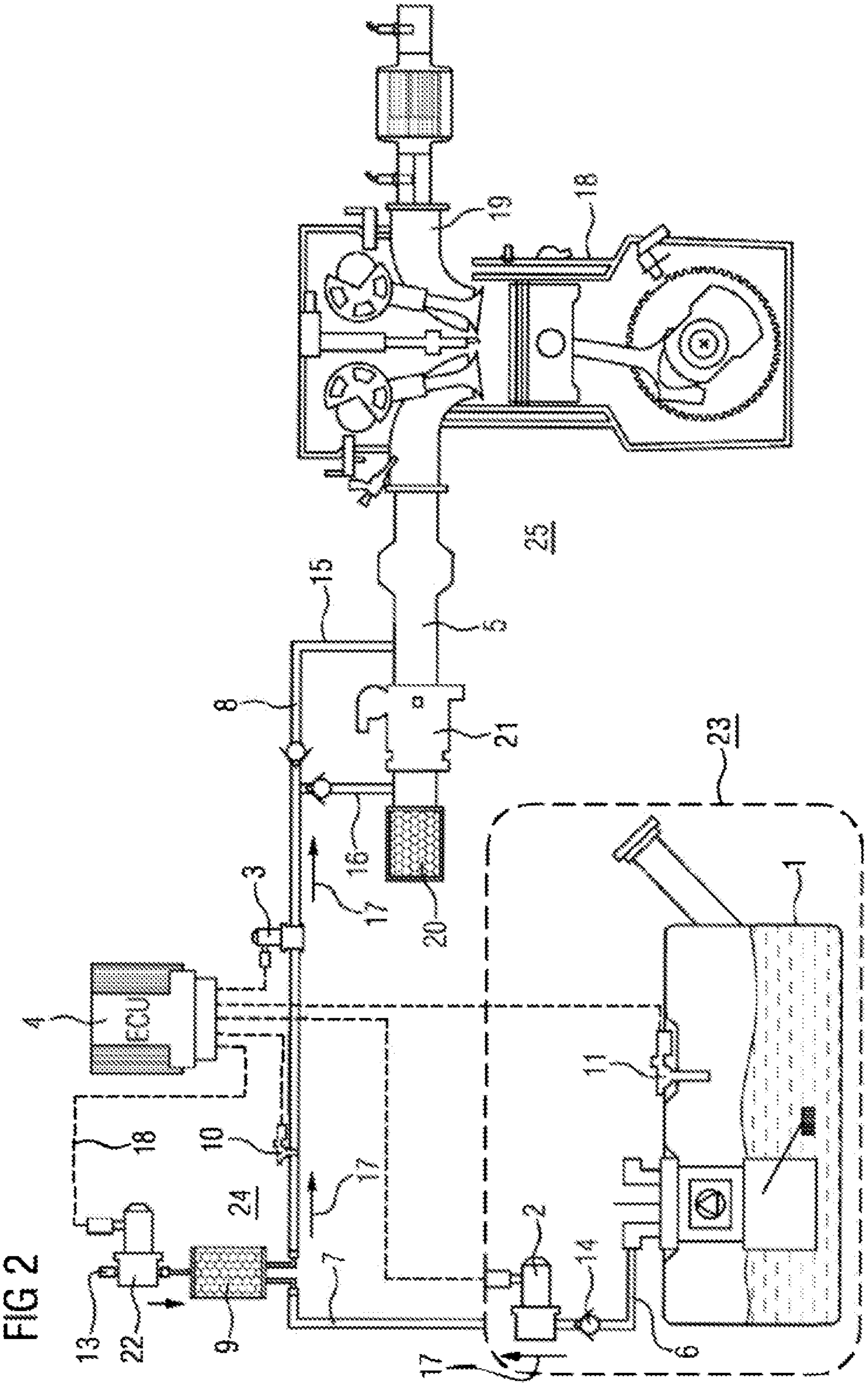
FIG. 2 shows a schematic representation of an exemplary fuel evaporation retention system of an internal combustion engine.

In the case of the method according to the disclosure described below for diagnosing the fuel evaporation system, the included components as well as volumes are divided up into three partial regions in order to avoid actively actuating the tank shut-off valve 2 for testing the leak-tightness of the tank region 23. These three partial regions are the tank region 23, the filter region 24 and the engine region 25. Apart from the above-mentioned use of a fresh-air shut-off valve 22 instead of a leakage diagnosis unit, a device used for performing the method corresponds to the device shown in FIG. 1 and is represented in FIG. 2.

Figure 3:
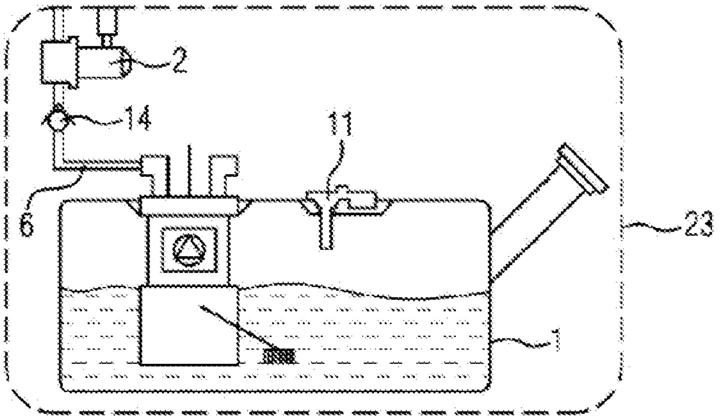
FIG. 3 shows an exemplary tank region of the fuel evaporation retention system shown in FIG. 2.

FIG. 3 shows the tank region 23 which includes the fuel tank 1, the tank shut-off valve 2, the tank ventilation line (tank region) 6, the combined pressure and temperature sensor 11 and the check valve 14. In order to test the leak-tightness of the tank region 23, the pressure change resulting from the temperature change of the gas volume in the fuel tank 1 is evaluated, based on the Gay-Lussac law, with a constant tank volume over a defined period of time after the internal combustion engine has been shut down and while the vehicle is at a standstill. An expected pressure profile from a given temperature profile during the cooling or warming of the fuel tank is compared, depending on the tank fill level after the terminal 15 (ignition terminal) has been switched on, with an actually measured pressure profile from the previous vehicle standstill phase. If the measured pressure profile lies within an adjustable corridor around the expected pressure profile, then it is concluded that a leak-tight fuel tank is present. The correlating temperature or pressure profiles are stored in the engine controller 4 in characteristic maps.

To be able to represent the described temperature and pressure profile, after an adjustable waiting time after the internal combustion engine has been shut down and while the vehicle is at a standstill, measured value pairs of the tank temperature and the tank pressure are formed at adjustable time intervals.

The process of acquiring the value pairs is represented below by way of example, with reference to FIG. 4, for a cooling process. The terminal 15 signal, the pressure and the temperature are plotted upward in FIG. 4. The time t is plotted to the right. The time interval 26 is the acquisition period. The reference numeral 27 illustrates the acquisition times lying within the acquisition period. The letter T illustrates a waiting time, the reference numeral 28 illustrates the point in time of the evaluation of the measured value pairs, the course K1 illustrates the course of the pressure when a leak is present, and the course K2 illustrates the course of the pressure when a leak-tight system is present.

Figure 4:
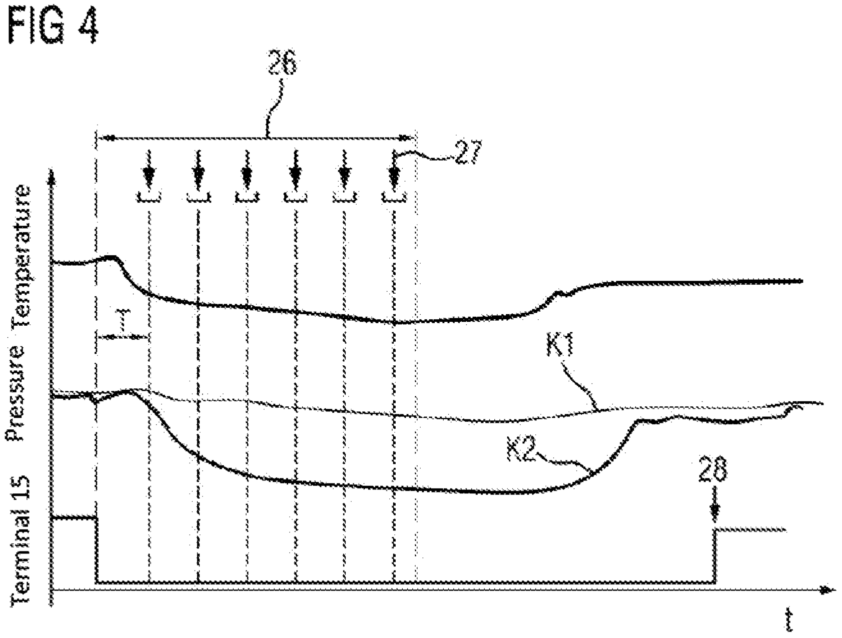
FIG. 4 shows a diagram of pressure and temperature profiles during the diagnosis of the exemplary fuel evaporation retention system shown in FIG. 2.

In order to explain the acquisition process represented in FIG. 4, two options are considered:

cyclical starting up—"waking up"—of the engine controller within the acquisition period 26 represented in FIG. 4.

installation of a measurement sensor system (pressure sensor, temperature sensor or combined pressure/temperature sensor), via which the acquisition times 27 represented in FIG. 4 can be realized. Furthermore, the acquired measured value pairs are stored in the sensor "in a non-volatile manner" and are made available to the engine controller 4 by the SENT protocol, via a dedicated analog or digital electrical signal or by BUS communication (e.g., LIN, CAN, etc.) the next time the terminals are changed (terminal 15 ON). After the acquisition period has ended, the sensor system switches off.

The process described for ascertaining the leak-tightness of the tank region 23 is only carried out if, during the previous driving cycle (starting from the moment the terminal 15 is switched on up until the moment the engine is shut down), adjustable pressure thresholds in the fuel tank were not exceeded or fallen short of That is to say that it is assumed that, as of an adjustable (defined) constant amount of differential pressure in the fuel tank 1 with respect to the surroundings, there cannot be any leak which exceeds the minimal leak diameter required by the legislation.

In order to ensure that when considering the positive pressure or negative pressure in the fuel tank 1 during the simultaneous active outgassing or condensation processes (formation of fuel vapor or liquefaction of vaporous fuel in the fuel tank) the system is not erroneously concluded to be a nominal system, the following physical principles serve as the basis for a calculation model in the engine controller:

$$\dot{m}_{Leck} = \sqrt{2\rho_{Umg}}\,\alpha\, A\,\sqrt{p_{Tank} - p_{Umg}} = \sqrt{2\rho_{Umg}}\,\alpha\, A\,\sqrt{\Delta p} \quad (1)$$

$$\dot{m}_{Aus/Kond} = k\frac{(p_{Dampf,HC} - p_{Partial,HC})}{p_{Tank}} \quad (2)$$

$$\Delta p = \frac{1}{2\rho_{Umg}}\left(\frac{\dot{m}_{Leck}}{\alpha\, A}\right)^2 \quad (3)$$

$$\frac{p_{Partial,LuftNorm}}{T_{Norm}} = \frac{p_{Partial,LuftTank}}{T} \rightarrow p_{Partial,LuftTank} = \frac{p_{Partial,LuftNorm} * T}{T_{Norm}} \quad (4)$$

$$p_{Partial,HC} = p_{Tank} - p_{Partial,LuftTank} \quad (5)$$

where:

$p_{Tank}$=absolute pressure in fuel tank [Pa];

$p_{Umg}$=ambient pressure [Pa];

$p_{Damp\,f,HC}$=vapor pressure of the liquid fuel [Pa];

$p_{Partial,HC}$=partial pressure of the liquid fuel [Pa];

$p_{Partial,LuftNorm}$=partial pressure of air under normal conditions [Pa];

$p_{Partial,LuftTank}$=partial pressure of air in the tank [Pa];

Δp=differential pressure of tank with respect to the surroundings [Pa];

A=cross—section of the leak (outlet cross—section) [$m^2$];

α=flow coefficient [—];

k=outgassing coefficient [kg/s];

$\rho_{Umg}$=density of ambient air [$kg/m^3$];

$\dot{m}_{Leck}$=mass flow through the leak [kg/s];

$\dot{m}_{Aus/Kond}$ = Mass flow generated by the $\frac{\text{outgassing}}{\text{condensation}}$ of the volatile fuel components [kg/s];

T=temperature in the fuel tank [K]; and $T_{Norm}$=temperature in the fuel tank [K].

If a leak is present in the fuel tank 1, the pressure will increase/fall until such time as the mass flow caused by the outgassing/condensation of the highly volatile fuel components is lower than the maximum possible mass flow through the leak, or until these two mass flows are in equilibrium.

$$|\dot{m}_{Aus/Kond}| \leq \dot{m}_{Leck}$$

For this reason, the threshold for evaluating the positive pressure or negative pressure in the fuel tank for quality testing the leak diagnosis is stored, depending on the boundary conditions of tank temperature and fuel filling level, in a characteristic map in the engine controller 4 by incorporating the physical relationships represented below.

$$\Delta p = \frac{1}{2\rho_{Umg}}\left(\frac{\dot{m}_{Aus/Kond}}{\alpha\, A_{min}}\right)^2 \quad (6)$$

Apart from the exact outgassing mass flow or the mass flow caused by the condensation, all the parameters of the represented relationship are known, where $A_{min}$ corresponds to the smallest leakage cross-section to be diagnosed.

The vapor pressure of the gaseous hydrocarbon phase can be determined with the aid of the following empirical equation.

$$p_{Dampf,HC} = X * T * RVP * e^{\left(-\frac{Y}{T}\right)} \quad (7)$$

In this case, X and Y correspond to constants. RVP (Reid Vapor Pressure) stands for the vapor pressure of a fuel composition measured under standard conditions and can be found in various tables. Therefore, the RVP is selected based on the most likely fuel composition for the respective national market.

In order to be able to rule out the possibility of pressure fluctuations (for example caused by the liquid fuel sloshing around as a consequence of high driving dynamics) leading to a false interpretation, i.e., to a faulty quality test, the assessment of the tank pressure gradient and the driving speed gradient is used to stop this passive quality test once adjustable limits have been reached.

Figure 5:
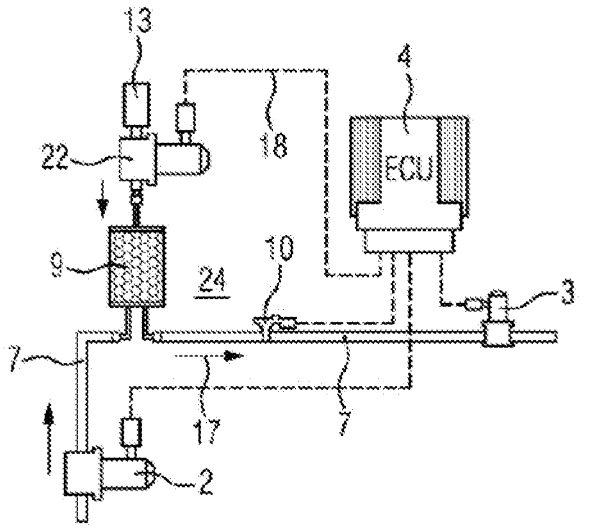
FIG. 5 shows components of the exemplary fuel evaporation retention system shown in FIG. 2 in the filter region.
Figure 6:
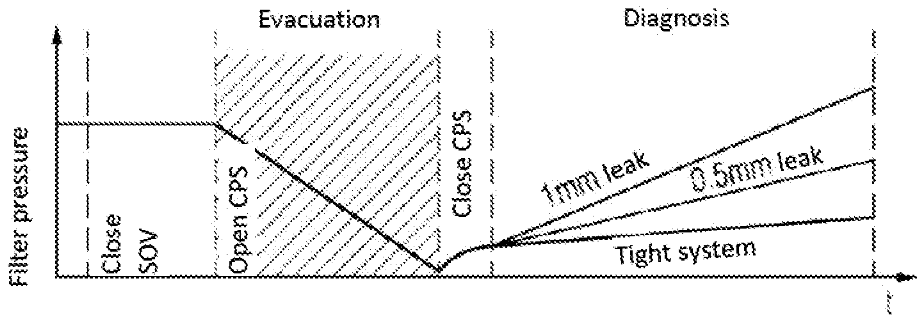
FIG. 6 shows a diagram of the filter pressure.

In order to diagnose a leak in the filter region 24 represented in FIG. 5, which includes the tank shut-off valve 2, the tank ventilation line (filter region) 7, the activated carbon filter 9, the fresh-air shut-off valve 22, the fresh-air filter 13, the pressure sensor 10 and the tank ventilation valve 3, the fresh-air shut-off valve 22 (SOV) is initially closed—as can be seen from FIG. 6. After a defined waiting time, an evacuation of the filter volume including the connected tank ventilation line 7 takes place by opening the tank ventilation valve 3 (CPS). After an adjustable negative pressure has been reached, the tank ventilation valve 3 (CPS) is closed in order to subsequently calculate and evaluate the ensuing pressure gradient.

Due to the constant volume of the filter region, it is possible to conclude that a system is leak-tight or to extrapolate the corresponding leakage diameters (see FIG. 6) by way of the evaluation of the resulting pressure gradient after an adjustable waiting phase (see time range "Close CPS" in FIG. 6) in the following evaluation region (see time range "Diagnosis" in FIG. 6). The expected pressure gradients in the diagnosis phase, which are enlisted to classify the leak diameters or to establish a leak-tight subsystem, are stored in the engine controller 4 depending on the gas temperature as well as the calculated activated carbon filter loading.

In order to determine the gas temperature, a temperature sensor is, for example, installed in the tank ventilation line 7 (filter) between the activated carbon filter 9 and the tank ventilation valve 3, i.e., in the filter region of the tank ventilation line.

Alternatively, the gas temperature of the purge medium can be modelled with the assistance of measured system temperatures (e.g., intake air temperature, ambient air temperature, etc.). The activated carbon filter loading is made available in the engine controller 4 by the tank ventilation functionality, using suitable calculation models.

Figure 7:
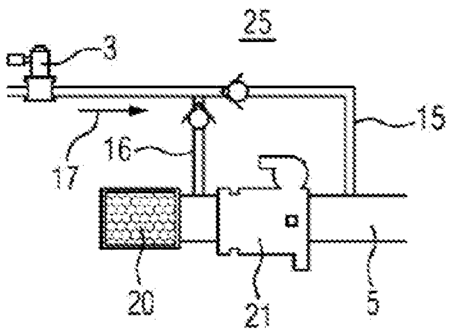
FIG. 7 shows a part of the engine region shown in FIG. 2.

In order to ascertain the functionality of the two purge lines 15 and 16 arranged in the engine region 25 (see FIG. 7) and of the tank ventilation valve 3 (CPS), the following actuation logic is applied to the tank ventilation valve 3 (CPS) and the fresh-air shut-off valve 22 (SOV) shown in FIG. 2.

Figure 8:
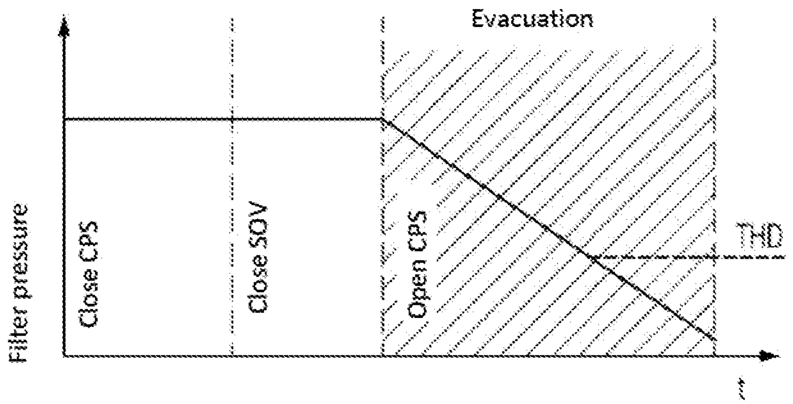
FIGS. 8-10 show further diagrams of the filter pressure.

The nominal system is represented in FIG. 8. After the tank ventilation valve 3 (CPS) has been closed, the fresh-air shut-off valve 22 (SOV) is closed after a defined waiting time. Due to the following opening of the tank ventilation valve 3 (CPS) in the case of the nominal system, this leads to the filter region being evacuated (see leakage diagnosis of filter region). If the pressure in the tank ventilation line upstream of the tank ventilation valve 3 falls short of an adjustable value THD, it is concluded that a functional tank ventilation path is present. Due to the identical actuation logic compared with a leakage diagnosis for the filter region 24, at least one purge path (purge path 15 or purge path 16 depending on the state of the internal combustion engine) can be diagnosed synchronously with the leakage diagnosis.

In order to diagnose the purge path which has not been tested in each case, the sequence must take place separately with an identical actuation logic.

Figure 9:
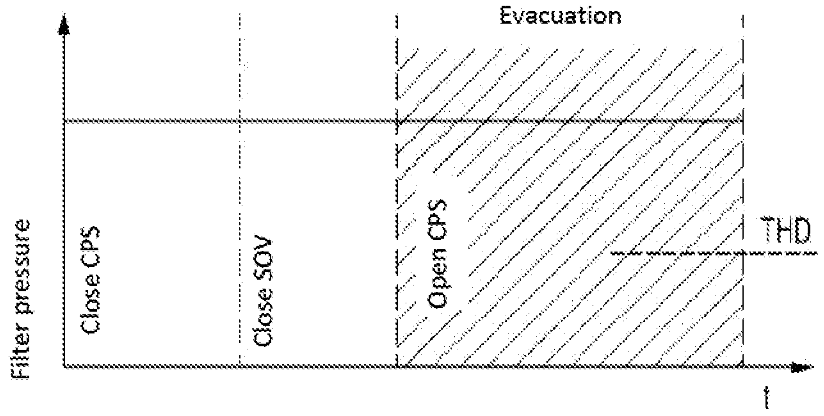

FIG. 9 illustrates the presence of a tank ventilation valve 3 (CPS) which is jammed closed or of a clogged purge path. In this case, the filter region 24 is not evacuated despite the fresh-air shut-off valve 22 (SOV) being closed and the tank ventilation valve 3 (CPS) being open.

Figure 10:
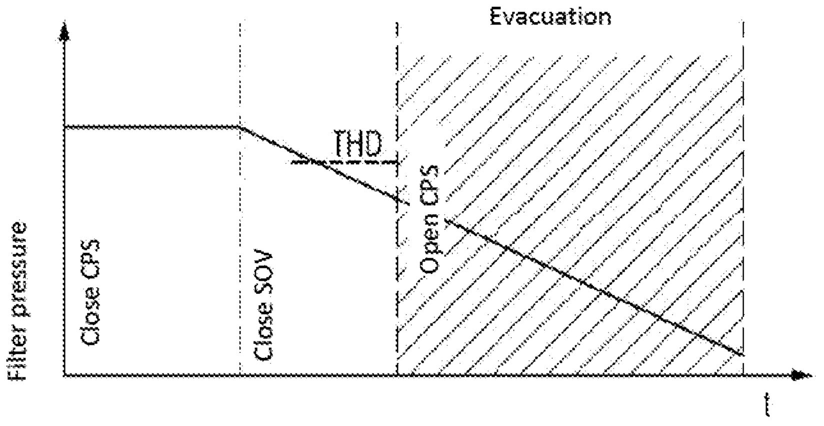

FIG. 10 illustrates the presence of a tank ventilation valve 3 (CPS) which is jammed open. In this case, despite the fact that the tank ventilation valve 3 (CPS) is not open, the filter region 24 is evacuated when the fresh-air shut-off valve 22 (SOV) is closed.

The above-mentioned technical features according to the disclosure produce the following advantages:

Diagnosis (according to legal regulations: leakage and tank ventilation line) of the entire evaporation system using a fresh-air shut-off valve and a pressure sensor system. Consequently, the omission of diagnostic pumps leads to a reduction in system costs and energy consumption.

Contrary to other known diagnostic methods, it is possible to evaluate the temperature increase in the fuel tank in order to determine a leak in the tank region (while the vehicle is at a standstill).

There is no active actuation of actuators while the vehicle is at a standstill, completely preventing noise emissions.

The division of the described diagnostic regions results in constant and closed volumes for the leakage diagnosis, which leads to an increase in the robustness of the diagnostic process.

The diagnostic procedure described in the filter region is insensitive to fuel in the fuel tank which emits a lot of gas.

The diagnostic procedure described in the filter region is insensitive to driving dynamics processes.

The described diagnostic procedure in the filter region is not dependent on the fuel level.

The small volume in the filter region results in very short diagnostic times for both the leak-tightness test and the tank ventilation line diagnosis.

Recognition of an open tank cap during vehicle operation within the diagnostic cycle provided for the filter region (leak-tightness test).

A number of implementations have been described. Nevertheless, it will be understood that various modifications may be made without departing from the spirit and scope of the disclosure. Accordingly, other implementations are within the scope of the following claims.

What is claimed is:

1. A method for diagnosing a leak in an evaporation system and in a tank ventilation line of an internal combustion engine supported by a vehicle, the method comprising:

diagnosing the evaporation system using a fresh-air shut-off valve of the evaporation system and a pressure sensor system of the evaporation system;

during the diagnosis on whether there is a leak in the evaporation system of the internal combustion engine, checking different diagnosis regions of the evaporation system, the diagnosis regions include a tank region of the internal combustion engine and a filter region of the internal combustion engine; and during the diagnosis of the tank ventilation line, checking a flow through the tank ventilation line, wherein during the check of the filter region:

closing the fresh-air shut-off valve;

after a predefined waiting time, evacuating the filter region including the tank ventilation line arranged in the filter region by opening a tank ventilation valve, closing the tank ventilation valve after a predefined negative pressure has been reached, and calculating and evaluating an ensuing pressure gradient after the tank ventilation valve has been closed, wherein during the check of the tank region:

evaluating a pressure change resulting from a temperature change of the gas volume in the fuel tank with a constant fuel tank volume after the internal combustion engine has been shut down and while the vehicle is at a standstill, and comparing an expected pressure profile from a predefined temperature profile during the temperature change after an ignition terminal of the internal combustion engine has been switched on with a measured pressure profile from a previous vehicle standstill phase and then, if the measured pressure profile lies within a predefined tolerance range around the expected pressure profile, recognizing a presence of a leak-free tank region.

2. The method of claim 1, further comprising:

during the check of the tank ventilation line, checking of the tank ventilation valve arranged in the tank ventilation line; and checking one or more purge paths arranged between the tank ventilation valve and an air path of the internal combustion engine.

3. The method of claim 2, further comprising:

during the check of the tank ventilation valve, determining the tank ventilation valve is jammed closed or jammed open.

4. A device for a combined diagnosis of a leak in an evaporation system and in a tank ventilation line of an internal combustion engine supported by a vehicle, the device comprising:

a fresh-air shut-off valve being part of the evaporation system and arranged between an activated carbon filter and a fresh-air filter;

a pressure sensor system; and an engine controller configured to:

diagnose the evaporation system using a fresh-air shut-off valve of the evaporation system and a pressure sensor system of the evaporation system;

during the diagnosis on whether there is a leak in the evaporation system of the internal combustion engine, check different diagnosis regions of the evaporation system, the diagnosis regions include a tank region of the internal combustion engine and a filter region of the internal combustion engine; and during the diagnosis of the tank ventilation line, check a flow through the tank ventilation line, wherein during the check of the filter region, the engine controller is further configured to:

close the fresh-air shut-off valve:

after a predefined waiting time, evacuate the filter region including the tank ventilation line arranged in the filter region by opening a tank ventilation valve;

close the tank ventilation valve after a predefined negative pressure has been reached, and calculate and evaluate an ensuing pressure gradient after the tank ventilation valve has been closed, wherein during the check of the tank region, the engine controller is configured to:

evaluate a pressure change resulting from a temperature change of the gas volume in the fuel tank with a constant fuel tank volume after the internal combustion engine has been shut down and while the vehicle is at a standstill, and compare an expected pressure profile from a predefined temperature profile during the temperature change after an ignition terminal of the internal combustion engine has been switched on with a measured pressure profile from a previous vehicle standstill phase and then, recognize a presence of a leak-free tank region, if the measured pressure profile lies within a predefined tolerance range around the expected pressure profile.

5. The device of claim 4, wherein the engine controller is further configured to:

during the check of the tank ventilation line, check the tank ventilation valve arranged in the tank ventilation line; and check one or more purge paths arranged between the tank ventilation valve and an air path of the internal combustion engine.

6. The device of claim 5, wherein the engine controller is further configured to:

during the check of the tank ventilation valve, determine if the tank ventilation valve is jammed closed or jammed open.

7. A device for diagnosing a leak in an evaporation system and in a tank ventilation line of an internal combustion engine, the device comprising:

a fresh-air shut-off valve being part of the evaporation system and arranged between an activated carbon filter and a fresh-air filter;

a pressure sensor system; and an engine controller configured to:

diagnose the evaporation system using a fresh-air shut-off valve of the evaporation system and a pressure sensor system of the evaporation system;

during the diagnosis on whether there is a leak in the evaporation system of the internal combustion engine, check different diagnosis regions of the evaporation system, the diagnosis regions include a tank region of the internal combustion engine and a filter region of the internal combustion engine; and during the diagnosis of the tank ventilation line, check a flow through the tank ventilation line, wherein during the check of the tank region, the engine controller is further configured to:

compare an expected pressure profile from a predefined temperature profile during a temperature change after an ignition terminal of the internal combustion engine has been switched on with a measured pressure profile from a previous vehicle standstill phase and then, recognize a presence of a leak-free tank region, if the measured pressure profile lies within a predefined tolerance range around the expected pressure profile.

* * * * *